(12) United States Patent
Schwarzman et al.

(10) Patent No.: US 8,927,937 B2
(45) Date of Patent: Jan. 6, 2015

(54) IONIZING RADIATION DETECTION

(75) Inventors: Alexander Schwarzman, Haifa (IL);
Naor Wainer, Zichron Yaakov (IL);
Amir Livne, Zichron Ya'aqov (IL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 14/115,124

(22) PCT Filed: Apr. 6, 2012

(86) PCT No.: PCT/IB2012/051717
§ 371 (c)(1),
(2), (4) Date: Nov. 1, 2013

(87) PCT Pub. No.: WO2012/153210
PCT Pub. Date: Nov. 15, 2012

(65) Prior Publication Data
US 2014/0070109 A1 Mar. 13, 2014

Related U.S. Application Data

(60) Provisional application No. 61/484,891, filed on May 11, 2011.

(51) Int. Cl.
*G01T 1/24* (2006.01)

(52) U.S. Cl.
CPC .. *G01T 1/24* (2013.01); *G01T 1/244* (2013.01)
USPC ..................................... 250/370.01; 250/371

(58) Field of Classification Search
USPC ........ 250/338.4, 370.01, 370.09, 370.15, 371
See application file for complete search history.

(56) References Cited

U.S. PATENT DOCUMENTS

| | | | |
|---|---|---|---|
| 5,248,885 | A | 9/1993 | Sato et al. |
| 5,905,772 | A | 5/1999 | Rutten et al. |
| 6,373,064 | B1 | 4/2002 | Yao et al. |
| 7,312,458 | B2 | 12/2007 | Blevis |
| 7,514,692 | B2 | 4/2009 | Bouhnik et al. |
| 7,652,258 | B2 | 1/2010 | Shahar et al. |
| 7,800,071 | B2 | 9/2010 | Shahar et al. |
| 2010/0078559 | A1 | 4/2010 | Szeles et al. |
| 2010/0086098 | A1 | 4/2010 | Shahar et al. |

*Primary Examiner* — Mark R Gaworecki

(57) ABSTRACT

A detector array (110) includes a detector (112) configured to detect ionizing radiation and output a signal indicative of the detected radiation, wherein the detector at least includes a semiconductor element (118) and an illumination subsystem (120) configured to generate and transfer sub-band-gap illuminating radiation to selectively illuminate only a sub-portion of the semiconductor element in order to produce a spatially patterned illumination distribution inside the element.

22 Claims, 4 Drawing Sheets

IONIZING RADIATION DETECTION

CROSS-REFERENCE TO PRIOR APPLICATIONS

This application is the U.S. National Phase application under 35 U.S.C. §371 of International Application No. PCT/IB2012/051717, filed on Apr. 6, 2012, which claims the benefit of U.S. Provisional Patent Application No. 61/484,891, filed on May 11, 2011 These applications are hereby incorporated by reference herein in their entirety.

FIELD OF THE INVENTION

The following generally relates to ionizing radiation detection and more particularly to semiconductor radiation detectors, and is described with particular application to computed tomography (CT); however, the following is also amenable to other imaging modalities such as nuclear medicine, digital radiography (DR), and/or other modalities used for security, non-destructive testing, medical imaging, and/or other fields.

BACKGROUND OF THE INVENTION

A computed tomography (CT) scanner includes a rotating gantry rotatably mounted to a generally stationary gantry. The rotating gantry supports an X-ray tube and an array of detectors, which is mounted on the rotatable gantry opposite the X-ray tube, across an examination region. The rotating gantry and hence the X-ray tube and the detector array rotate around the examination region about a longitudinal or z-axis. The X-ray tube is configured to emit ionizing radiation that traverses the examination region (and a portion of a subject or object in the examination region) and irradiates the array of detectors. The array of detectors includes a plurality of detectors that detect the ionizing radiation and generate a signal indicative thereof. A reconstructor reconstructs an image, generating volumetric image data indicative of the portion of the subject or object in the examination region.

Wide band gap semiconductor detectors have been used to detect ionizing radiation for application such as security, non-destructive testing, and medical imaging. Unfortunately, such detectors are not well-suited for all imaging applications. By way of example, for Spectral CT, such detectors may have insufficient time resolution and response homogeneity and suffer from charge trapping and polarization. For most of the applications such detectors are required to be thick to provide the high stopping power necessary for absorption of high energy X-ray and γ-photons. The thickness of the detector crystal may have to exceed ten (10) millimeters (mm), typically three (3) to five (5) mm for CT and PET applications, with the lateral size ranging from ten by ten (10×10) to twenty by twenty (20×20) square millimeters ($mm^2$). Obtaining a flawless detector crystal of that size with precisely controlled characteristics like composition, defect concentration, doping, etc. may not be readily attainable. Moreover, hundreds of volts are applied to the detectors to provide effective charge separation and collection.

The high voltage biasing and presence of inevitable crystal defects and imperfections lead to charge trapping inside the crystal and extended space charge regions formation, and, eventually, affect generation and collection of charge carriers produced by the ionizing radiation inside the detector crystal and the detectors response time, and decreases the signal-to-noise ratio and energy resolution of the detector. Another obstacle for the semiconductor detectors application in high flux radiation detection areas such as medical CT is that the X-ray flux dramatically changes during the scan which affects the detector crystal properties and can cause some undesirable effects such as signal pile-up, saturation, charge trapping, etc.

Techniques for reducing the charge trapping and polarization to improve the radiation detector performance, based on detector heating and sub-band-gap irradiation, are described in U.S. Pat. No. 5,248,885, U.S. Pat. No. 5,905,772, U.S. Pat. No. 7,312,458, U.S. Pat. No. 7,514,692, U.S. Pat. Nos. 7,652,258 and 7,800,071, and US Patent Application Publication 2010/0078559. However, both the heating and the illumination of the whole detector crystal greatly decreases electric resistance of the detector by generating additional charge carriers, which, in turn, increases the dark current and noise level, and requires considerable changes in the detector-coupled electronics. The non-homogeneous, but not patterned, IR illumination of the detector proposed in 2010/0078559, in addition to the above, also increases the detector response inhomogeneity.

Furthermore, the above techniques do not provide effective evacuation of holes, produced by ionizing radiation in detector regions situated deep inside the crystal and far from the cathode. The lack of an effective mechanism for a fast evacuation of holes from the crystal, irradiated with a high flux of ionizing radiation, leads to charge trapping and polarization and affects the detector response time making it insufficient for the high flux applications. Moreover, if the pixilated detector has on the anode side a steering electrode, which is intended for the faster evacuation of holes generated far from the cathode, illumination of such a detector increases electric conductivity of these sub-anode crystal regions and the pad-to-steering electrode leakage current by up to two orders of magnitude, which may hinder or even obstruct utilization of the steering electrodes proven to improve response time and energy resolution of the detectors.

In view of the foregoing, there is an unresolved need for other approaches to overcome deficiencies of semiconductor detectors in high flux imaging applications.

SUMMARY OF THE INVENTION

Present aspects of the application provide a new and improved radiation detection technique that addresses the above-referenced problems, related to semiconductor detectors application in CT, and others.

In one aspect, a detector array includes a detector configured to detect ionizing radiation and output a signal indicative of the detected radiation. The detector at least includes a semiconductor element. The detector array further includes an illumination subsystem configured to generate and transfer sub-band-gap illuminating radiation to selectively illuminate only a sub-portion of the semiconductor element in order to produce a spatially patterned illumination distribution inside the element.

In another aspect, a method includes illuminating only a sub-portion of a semiconductor element of a detector, which is configured to detect ionizing radiation, with spatially patterned sub-gap-band illuminating radiation, and detecting ionizing radiation with the detector concurrently with the illuminating of only the sub-portion of the semiconductor element.

In another aspect, a computer readable storage medium is encoded with computer readable instructions, which, when executed by a processor of a computing system, causes the system to: change at least one of an illumination intensity or an illumination pattern, or a voltage applied to an illuminated sub-portion or to an electric contact connected to a semiconductor element of a detector, depending on a flux of ionizing radiation incident into the detector or on the detector output signal, during measurement or between the measurements.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
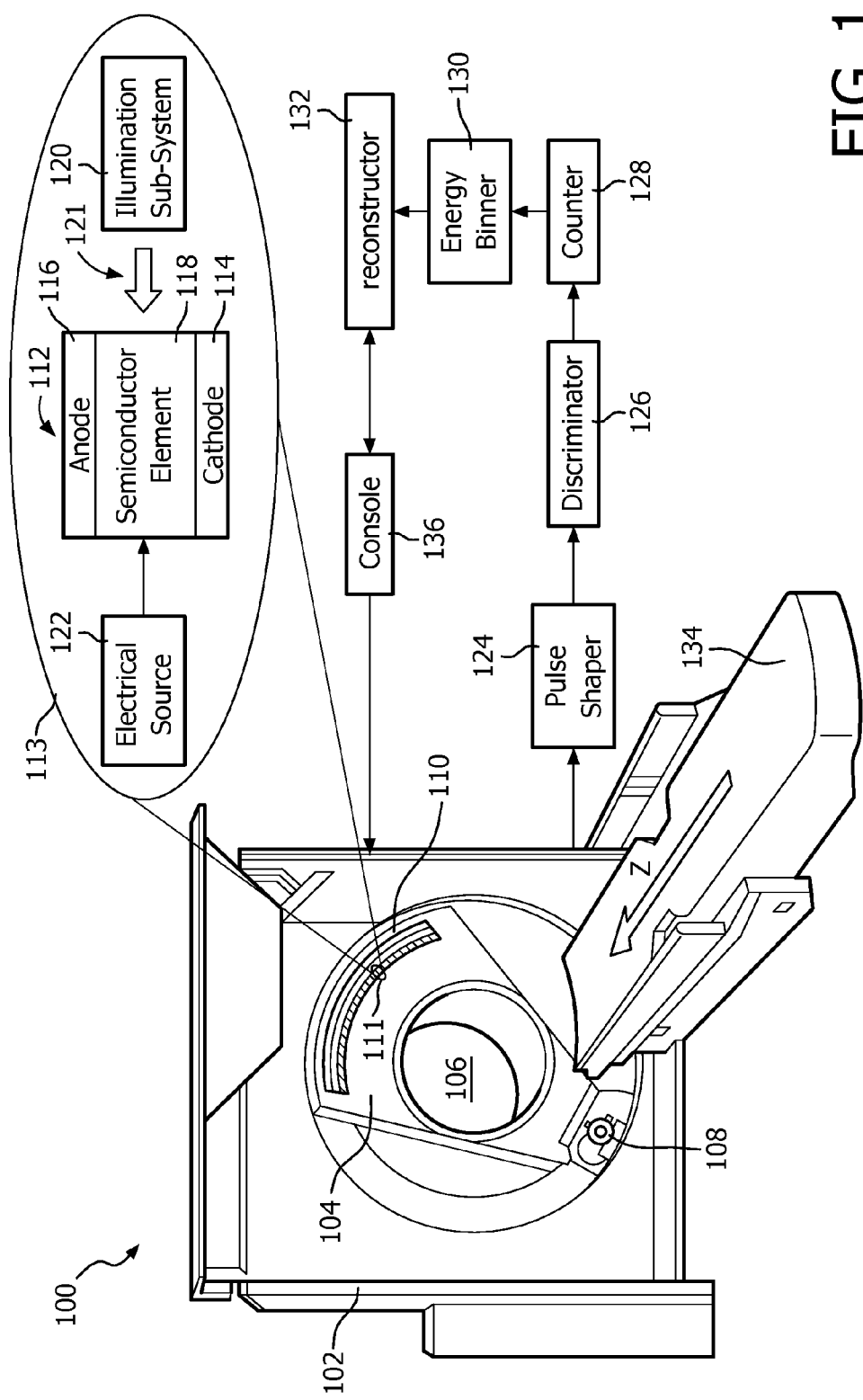
FIG. 1 schematically illustrates an example imaging system.

FIG. 1 schematically illustrates an imaging system 100 such as a computed tomography (CT) scanner. In other embodiments, the imaging system includes a digital radiography (DR), nuclear medicine, and/or another device that detects ionizing radiation.

The illustrated imaging system 100 includes a stationary gantry 102 and a rotating gantry 104, which is rotatably supported by the stationary gantry 102. The rotating gantry 104 rotates around an examination region 106 about a longitudinal or z-axis. A radiation source 108, such as an X-ray tube, is supported by and rotates with the rotating gantry 104 around the examination region 106. The radiation source 108 emits ionizing radiation that is collimated to produce a generally fan, wedge, or cone shaped radiation beam that traverses the examination region 106.

An array of detectors 110 (also referred to herein as detector array 110) includes a one or two dimensional detector module 111 with one or more detector pixels that are configured to detect ionizing radiation that traverse the examination region 106 and generate an electrical signal indicative thereof. As shown, the detector array 110, for at least one of the detector modules 111, includes an illumination sub-system 120 and an electrical source 122 of power. The electrical source 122 and the illumination sub-system 120 can also serve as a common electrical source and an illumination source for other detector modules. Together, the at least one of the detection modules 111, the illumination sub-system 120, and the electrical source 122 are referred to herein as a detection apparatus 113.

The illustrated detector module 111 includes a semiconductor radiation detector 112 having a cathode 114, an anode 116, on a semiconductor element 118 of cadmium telluride (CdTe), cadmium zinc telluride (CdZnTe or CZT), or the like. The illumination sub-system 120 is configured to generate a non-uniform, spatially patterned and dynamically varying sub-band-gap radiation 121 for illuminating the semiconductor element 118. The electrical source 122 is used to provide constant or temporarily varying bias voltage or voltages to one or more electric contacts on the surfaces of the semiconductor element 118.

As described in greater detail below, the sub-band-gap radiation 121 and the bias voltage can be employed to control the electric field and conductivity distribution in the semiconductor element 118, reduce effect of space charge on generation and collection of charge carriers produced by ionizing radiation (signal charge carriers) from the source 108, provide an effective drain for slow charge carriers (holes), and improve collection of the signal charge carriers when the detector 112 is irradiated with and detects high flux ionizing radiation. In one instance, this improves response time of the detector 112, energy and spatial resolution, stability and homogeneity of the multi-pixel detector response, increase the signal-to-noise ratio, and decrease the cross talks, without sufficiently increasing thermal noise and dark current.

A charge sensitive amplifier and pulse shaper 124 process the signal output of a detector pixel and generate a pulse (e.g., a voltage or a current) indicative of a detected photon. In a photon counting spectral CT application, an energy-discriminator 126 discriminates the pulse based on its peak voltage. In this example, the discriminator 126 includes a plurality of comparators that respectively compare the amplitude of the pulse with one or more thresholds that correspond to different energy levels. A comparator generates an output signal (e.g., a high or low) in response to the amplitude exceeding its threshold level. A counter 128 counts the output signals respectively for each threshold. An energy-binner 130 bins the counts into energy ranges corresponding to ranges between the energy thresholds. The binned data is used to energy-resolve the detected photons. In non-photon counting spectral CT applications, the output of the shaper 124 is otherwise processed.

A reconstructor 132 reconstructs an image based on the energy distribution and the flux of the detected X-ray photons. In one instance, the binned data can be used to isolate different types of materials (e.g., bone, fat, contrast material, etc.) having different X-ray absorption characteristics. A patient support 134, such as a couch, supports an object or subject in the examination region 106. A general purpose computing system serves as an operator console 136, and includes an output device such as a display and an input device such as a keyboard, mouse, and/or the like. Software resident on the console 136 allows the operator to control the operation of the system 100, for example, allowing the operator to select an imaging protocol employing the illuminator 122, initiate scanning, etc.

Figure 2:
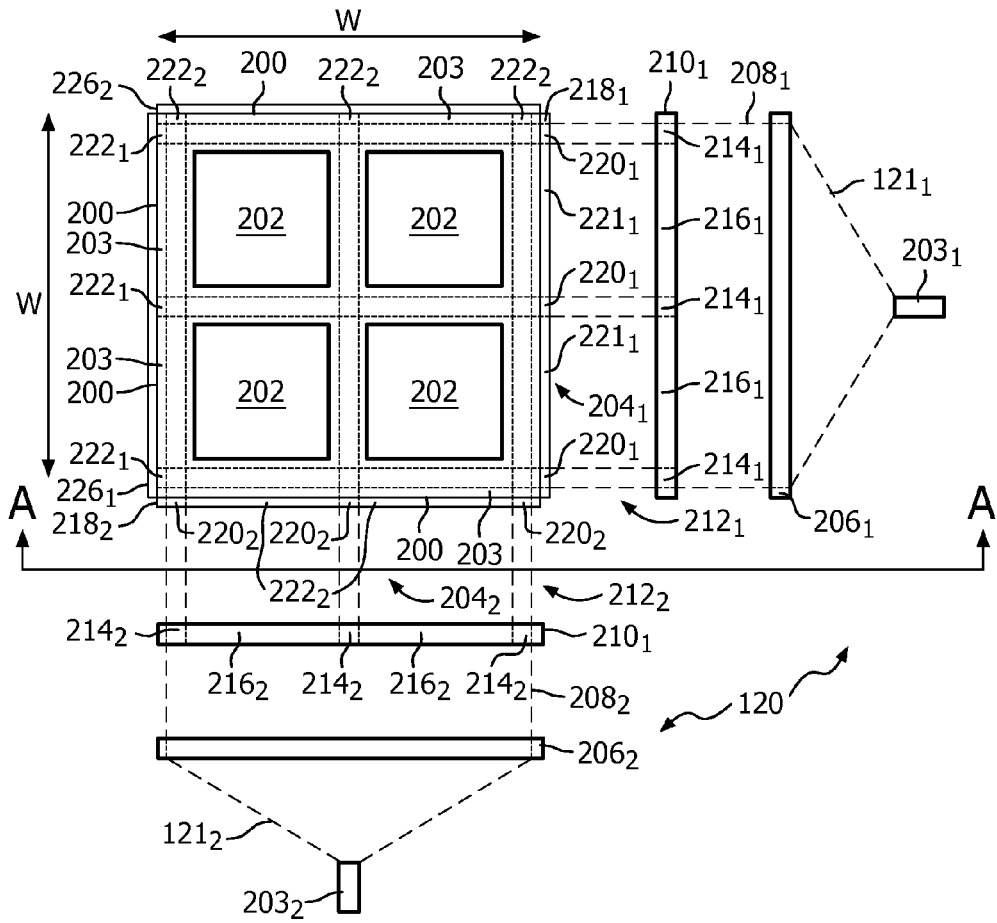
FIG. 2 schematically illustrates a top down view of an example detector in connection with an illumination sub-system and electrical source.
Figure 3:
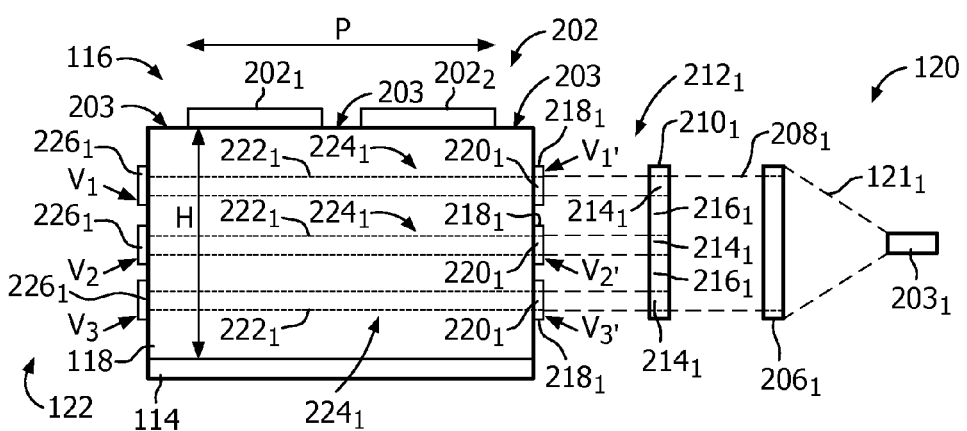
FIG. 3 schematically illustrates a side view of the example detector in connection with the illumination sub-system and the electrical source.

FIGS. 2 and 3 schematically illustrate an example sub-portion of the detector 112 in connection with the illumination subsystem 120 and electrical source 122. FIG. 2 shows a top down view looking into the anode 116, and FIG. 3 shows a side view, looking into a side of the detector 112 from a line A-A of FIG. 2.

The illustrated anode 116 is a pixilated anode without steering electrode. For sake of brevity and clarity, the illustrated portion of the pixilated anode 116 includes only four (4) pixels 200 arranged in a two-dimensional (2D) array, with each pixel 200 including an anode pad 202 surrounded by a non-anode pad region 203. However, it is to be understood that the pixilated anode 116 may include more or less pixels 200 such as a twenty by twenty (20×20) array, a sixteen by thirty-two (16×32) array, or other arrangement of pixels 200. In another embodiment, the pixilated anode 116 may also include a steering electrode or steering electrodes for each pixel. In yet another embodiment, the anode 116 may be not pixilated.

In this example, a pixel 200 is about one (1) millimeter (mm) square, and the corresponding pad 202 is in a range from about a half (0.5) of a millimeter (mm) to about nine tenths (0.9) of a millimeter (mm) square. A pitch ("P"), which defines a center-to-center distance between two pads 202, is about one (1) millimeter (mm). A width ("W") of the semiconductor element 118 is a function of the number of pixels, the geometry of the pixels and the pitch. The illustrated semiconductor element 118 has a thickness, depth or height ("H") in a range from about three (3) to about seven (7) millimeters (mm), such as five (5) millimeters (mm). The above geometry is provided for explanatory purposes and is not limiting, and other geometries are also contemplated herein The illumination subsystem 120 includes sources $203_1$, and $203_2$ (collectively referred to herein as illumination sources), one positioned to illuminate the semiconductor element 118 through a first side $204_1$ of the semiconductor element 118 and another positioned to illuminate the semiconductor element 118 through a second side $204_2$ of the semiconductor element 118. The sources $203_1$ and $203_2$ are configured to emit sub-band-gap illuminating radiation $121_1$ and $121_2$, or illumination. An example of such an illumination source (for the illustrated detector 112, which is configured to detect ionizing radiation such as X-ray, gamma ray, ultraviolet, etc.) includes an infrared (IR) source such as a solid state laser, light emitting diode (LED), filtered broadband IR source, etc.

In one instance, the source $203_1$ and $203_2$ are configured to emit in a wavelength range from more than three thousand (3000) to eight hundred (800) microns for CdTe and CZT. In yet another instance the illumination wavelength may be chosen so that the illumination photon energy does not exceed one half (½) of the semiconductor element band gap, which may turn generation of electron-hole pairs by illuminating radiation into a less efficient three-stage process and further impede increasing of semiconductor conductivity in the cathode-to-anode direction and the detector dark current.

The semiconductor element 118 is generally transparent to the illumination, so the illuminating radiation does not considerably excite the semiconductor element 118, i.e. does not generate electron-hole pairs by exciting electrons from the valence band to the conductance band of the semiconductor element 118 and therefore is not absorbed inside the semiconductor element 118, other than by defects ionization and/or charge carriers de-trapping. The increase in electrical conductivity of the illuminated regions is mostly provided by the charge carrier de-trapping from the deep defect levels.

The illustrated illumination subsystem 120 further includes collimators $206_1$, and $206_2$ that are located between the semiconductor element 118 and the sources $203_1$ and $203_2$ and that respectively are configured to collimate the illumination radiation $121_1$, and $121_2$ to form collimated radiation $208_1$, and $208_2$ directed towards the semiconductor element 118. The illustrated illumination subsystem 120 further includes patterned collimators $210_1$ and $210_2$ that are located between the semiconductor element 118 and the collimators $206_1$, and $206_2$ and that selectively collimate the beam $208_1$, and $208_2$ to form a pattern or patterned set of individual beams $212_1$ and $212_2$.

The patterned collimators $210_1$ and $210_2$ each include a two dimensional (2D) grid of material free regions $214_1$ and $214_2$ interleaved with light attenuating regions $216_1$ and $216_2$ along the widths of the semiconductor element 118, and material free regions $214_1$ and $214_2$ (not visible) interleaved with light attenuating regions $216_1$ and $216_2$ (not visible) along the height of the semiconductor element 118. In another embodiment, the patterned collimators $210_1$ and $210_2$ are part of the collimators $206_1$, and $206_2$. In yet another embodiment, the patterned collimators $210_1$ and $210_2$ are affixed to the semiconductor element 118. In yet another embodiment, as described below, the material free regions $214_1$ and $214_2$ along the width include a single material free region, which forms a beam slice instead of multiple individual beams.

A plurality of masks $218_1$ and $218_2$ are located between the semiconductor element 118 and the patterned collimators $210_1$ and $210_2$ and extend along the widths of the semiconductor element 118, separated from each other along the height of the semiconductor element 118, on the sides $204_1$ and $204_2$. Each of the masks $218_1$ and $218_2$ includes light transmissive regions $220_1$ and $220_2$ that allow light to pass and light opaque regions $221_1$ and $221_2$ that block or attenuate light. In the illustrated embodiment, the light transmissive regions $220_1$ and $220_2$ and the material free regions $214_1$ and $214_2$ are in substantial geometrical alignment and have similar geometry. In another embodiment, the light transmissive regions $220_1$ and $220_2$ and the material free regions $214_1$ and $214_2$ may not have the same geometry, for example, the light transmissive regions $220_1$ and $220_2$ may be smaller than the material free regions $214_1$ and $214_2$.

In the illustrated embodiment, the masks $218_1$ and $218_2$ are affixed to the semiconductor element 118. The masks $218_1$ and $218_2$ may be affixed the semiconductor element 118 via an adhesive, may be patterned on the element, and/or otherwise affixed to the semiconductor element 118. In another embodiment, the masks $218_1$ and $218_2$ are part of the patterned collimators $210_1$ and $210_2$. In yet another embodiment, the masks $218_1$ and $218_2$ are otherwise located in connection with the detector 112. In yet another embodiment, the masks $218_1$ and $218_2$ are omitted. In yet another embodiment, the masks $218_1$ and $218_2$ are used in place of the patterned collimators $210_1$ and $210_2$.

For this example, as shown in FIG. 2, three individual beams $212_1$ extend horizontally and three individual beams extend vertically $212_2$ and the beams $212_1$ and $212_2$ respectively traverse paths $222_1$ and $222_2$ inside of the semiconductor element 118. As shown in FIG. 3, the individual beams $212_1$ and $212_2$ traverse three separate layers $224_1$ along the paths $222_1$ and $222_2$ inside of the semiconductor element 118, and each layer has a thickness extending along the height of the semiconductor element 118. The illustrated embodiment includes three of the layers $224_1$. However, other embodiments may include more or less layers $224_1$, and the beams $212_1$ and $212_2$ may traverse different layers and do not necessarily need to cross each other. Generally, the number of possible layers $224_1$ depends on the thickness of the layers, which is preferred to be arranged as small and homogeneous as possible.

A plurality of reflectors $226_1$ and $226_2$ (e.g., mirrors, a reflective film, etc.) extends along the widths of the semiconductor element 118, separated from each other along the height of the semiconductor element 118, on a side opposite the side $204_1$ in which the patterned illumination $212_1$ and $212_2$ enters the semiconductor element 118. The reflectors $226_1$ and $226_2$ reflect portions of the beams $212_1$ and $212_2$ impingent thereon back into the paths $222_1$ and $222_2$ and layers $224_1$. This may facilitate providing a more homogenous in-plane or in-line illumination intensity distribution along the paths $222_1$ and $222_2$ and layers $224_1$.

By way of example, where the intensity of the beams $212_1$ and $212_2$ attenuates along the path $222_1$ and $222_2$ such that an initial intensity of the beams $212_1$ and $212_2$ entering the semiconductor element 118 is greater than an intensity of the beams $212_1$ and $212_2$ at the reflector $226_1$ and $226_2$, the reflected portions add to the intensity of the beams $212_1$ and $212_2$ such that the illumination intensity distribution along the paths $222_1$ and $222_2$ becomes more homogeneous. In the illustrated embodiment, the reflectors $226_1$ and $226_2$ are affixed to the semiconductor element 118. This may be achieved via an adhesive, a metallic bond, or otherwise. In another embodiment, the reflectors 226$_1$ and 226$_2$ are otherwise held next to the semiconductor element 118.

Electrically conductive contacts (not shown) are affixed to, or integrated into the masks 218$_1$ and 218$_2$ and/or the reflectors 226$_1$ and 226$_2$. Such contacts may be in the form of films on the order of a few tens of nanometers thick and may include gold, platinum, and/or other electrically conductive material, providing an effective holes evacuation from the illuminated semiconductor element sub-portion and that is transparent (like indium tin oxide) or semi-transparent to the beams 212$_1$ and 212$_2$.

The contacts can also be electrically coupled to the illuminated sub-portion of the semiconductor element 118 by gold, platinum, etc., or deposited onto the element in form of a comb-like array of narrow (less than the illumination wavelength) metal stripes, which can be made semi-transparent for the illumination. In another embodiment, the electrically conductive contacts are inside of the semiconductor element 118. The electrical contacts can be used for applying bias to the semiconductor element 118 and/or to the illuminated sub-portion of the semiconductor element 118 and/or for the signal read out, collection and/or registration of charge carriers generated by ionizing radiation detected by the semiconductor element 118.

As shown in FIG. 3, the electrical source 122 applies electric potentials $V_1$, $V_2$ and $V_3$ respectively to the electrically conductive contacts of the masks 218$_1$ and 218$_2$, and electric potentials $V_{1'}$, $V_{2'}$ and $V_{3'}$ respectively to the reflectors 226$_1$ and 226$_2$. In the illustrated embodiment, the absolute value of the electric potentials linearly scales downward from the cathode 114 towards the anode pads 202 such that $V_1 > V_2 > V_3 > V_{cathode} < 0$ and $V_{1'} > V_{2'} > V_{3'} > V_{cathode} < 0$. In the illustrated embodiment, $V_{1'}$ and $V_1$, $V_{2'}$ and $V_2$, and $V_{3'}$ and $V_3$, are not exactly equal. In another embodiment, $V_{1'} = V_1$, $V_{2'} = V_2$, and $V_{3'} = V_3$. It is to be understood that the six potentials discussed in this example are for explanatory purposes and are not limiting; in other embodiment, $V_1, \ldots V_n$ (wherein n is an integer) electrical potentials may be applied to the illuminated layers or any other sub-portions of the semiconductor element 118.

The patterned selective sub-band-gap illumination of the detector semiconductor element described herein, employed with or without applying electric potential to the illuminated sub-portions of the element, in some other configurations, not shown here for sake of brevity, can provide a numerous improvements of the semiconductor element characteristics and operation, e.g. it can be used for decreasing cross-talks between adjacent pixels, and etc.

Variations are contemplated.

Figure 4:
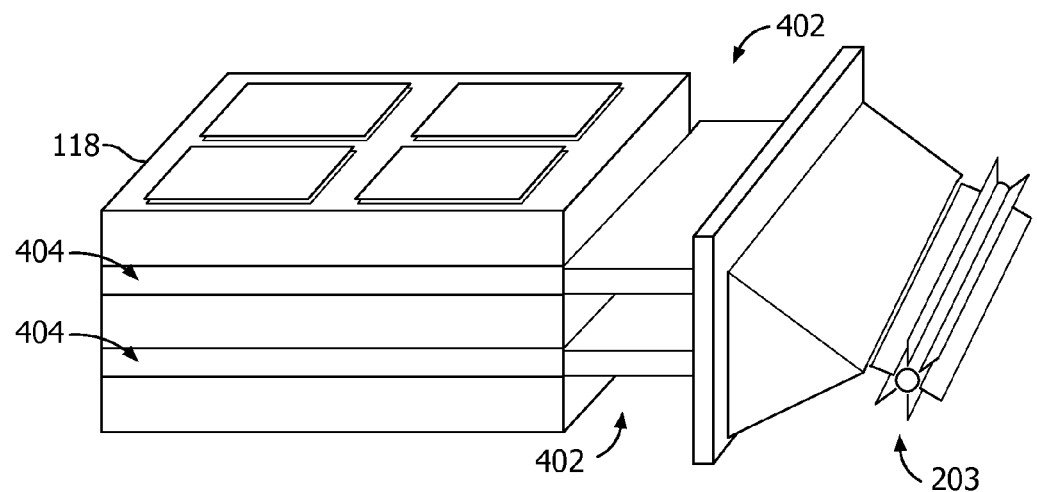
FIGS. 4 and 5 schematically illustrate the example detector in connection with alternate illumination sub-systems.

FIG. 4 shows a variation in which a plurality of layers or slices of illumination 402 (instead of the individual beams 212$_1$) extend along the width of the semiconductor element 118 and are used to illuminate selected layers 404 within the semiconductor element 118. With this configuration, a single illumination source 203 can be used to illuminate the selected regions 404 in the semiconductor element 118. Other components described herein and not shown in FIG. 4 have been left out for sake of clarity.

Figure 5:
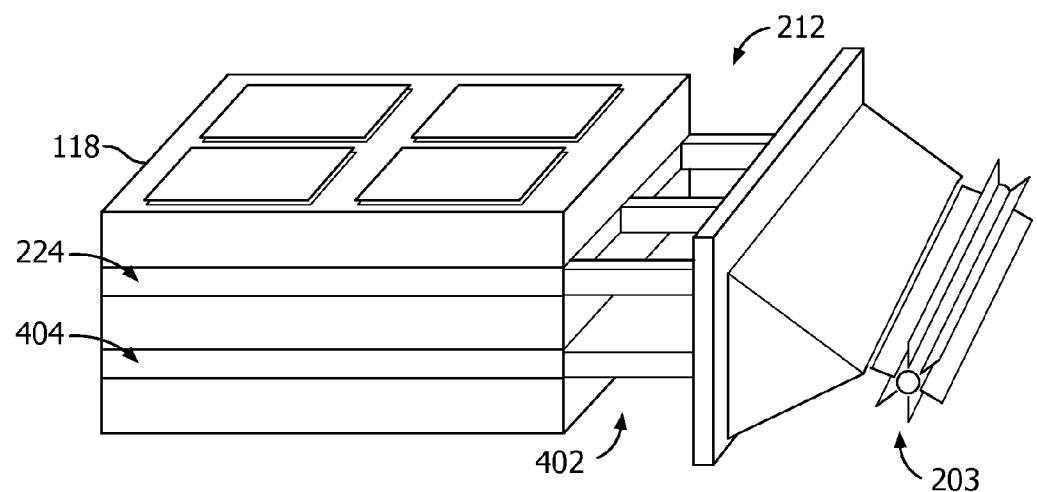

FIG. 5 shows a variation in which both individual light beams 212$_1$ and 212$_2$, extending along the paths (as shown in FIGS. 2 and 3), and one or more light beams 402, extending along the width (as shown in FIG. 4), are concurrently used to illuminate selected paths 224 and/or layers 404 within the semiconductor element 118. Other components described herein can be also included and are not shown in FIG. 5 for sake of clarity.

In the illustrated embodiment, the illumination subsystem 120 includes separate sources 203$_1$ and/or 203$_2$, which are single point illuminators. In a variation, at least one of the sources 203$_1$ and/or 203$_2$ is a multi-point and/or multi-source illuminator in that it can illuminates from more than a single point and/or source.

In the illustrated embodiment, the sources 203$_1$ and/or 203$_2$ are shown separated from the semiconductor element 118. In a variation, the sources 203$_1$ and/or 203$_2$ can be coupled directly (or through some light conducting medium) to the semiconductor element 118.

In yet another variation, the sources 203$_1$ and/or 203$_2$ can be coupled to the collimators 206$_1$ and 206$_2$, the patterned collimators 210$_1$ and 210$_2$, the mask 218$_1$ and 218$_2$, reflectors, mirrors, and/or other media capable of producing the patterns of non-homogeneous illumination distribution inside the semiconductor element 118.

In another variation, optical fibers or wave guides coupled to the sources 203$_1$ and 203$_2$ and the semiconductor element 118 provide optical paths for the beams 212$_1$ and 212$_2$ to the semiconductor element 118 and the layers 224$_1$.

In another variation, the detector 122 is a silicon, gallium arsenide (GaAs) based or any other semiconductor detector.

Figure 6:
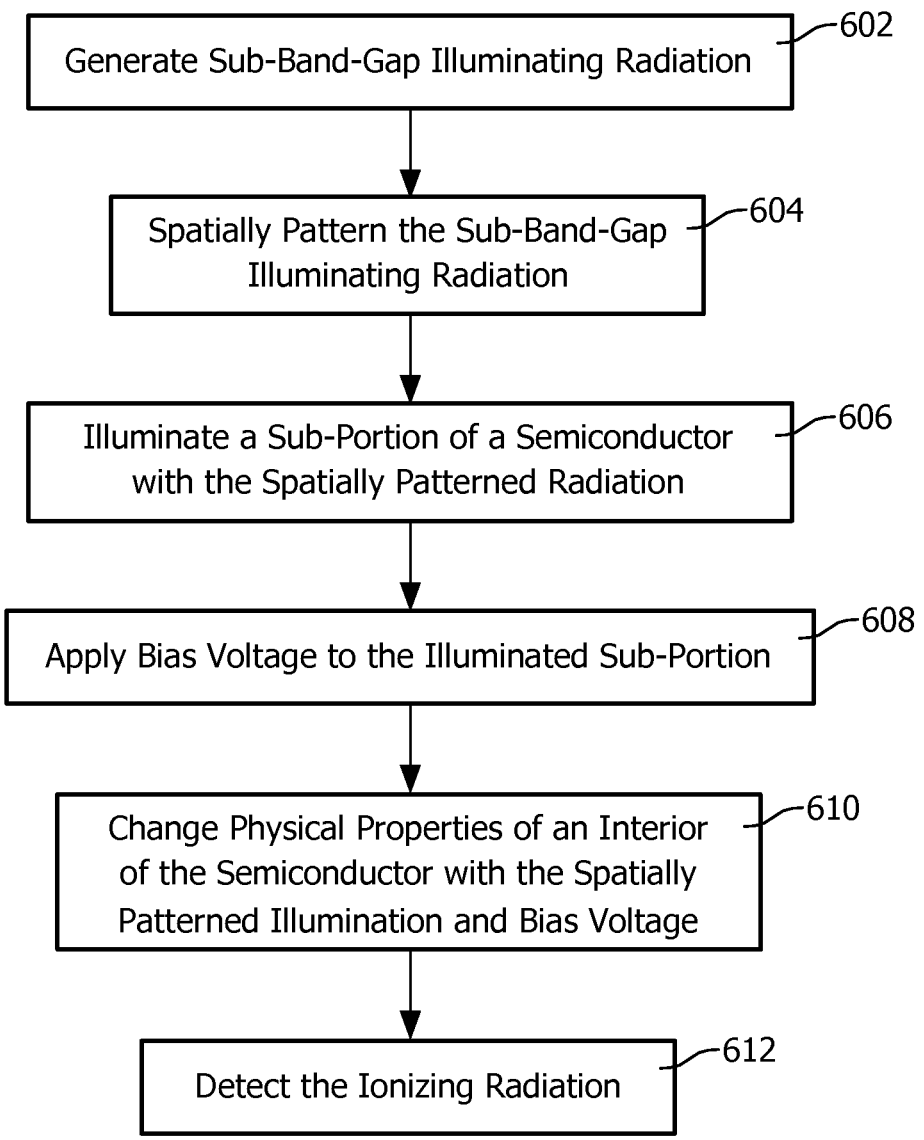
FIG. 6 illustrates a method in accordance with the example detector, the illumination sub-system, and the electrical source.

FIG. 6 illustrates a method in accordance with the description herein.

It is to be appreciated that the ordering of the acts in the methods described herein is not limiting. As such, other orderings are contemplated herein. In addition, one or more acts may be omitted and/or one or more additional acts may be included.

At 602, an illumination source generates sub-band-gap illuminating radiation for illuminating a semiconductor element of a detector configured to detect ionizing radiation.

At 604, the sub-band-gap illuminating radiation is collimated and patterned via a grid, patterned collimator or the like to form the non-uniform, spatially patterned illumination distribution inside the semiconductor element. For example, the illuminated regions may have a form of individual beams, in some embodiments forming a grid, and/or a form of layers.

At 606, the radiation beams is used to selectively illuminate only a sub-portion of the semiconductor element.

At 608, a bias voltage is applied to the illuminated sub-portion. This act can be performed before, after or concurrently with any of the acts 602-606.

At 610, the radiation beams and bias voltage are controlled to cause a predetermined change of the physical properties of the interior of the semiconductor element, as described herein.

At 612, the detector 112, while being illuminated with the radiation beams and with the bias voltage applied, is used to detect the ionizing radiation.

The above may be implemented via one or more processors executing one or more computer readable instructions encoded or embodied on computer readable storage medium such as physical memory which causes the one or more processors to carry out the various acts and/or other functions and/or acts. Additionally or alternatively, the one or more processors can execute instructions carried by transitory medium such as a signal or carrier wave.

Generally, the patterned sub-band-gap illumination 212$_1$ and 212$_2$ can be used to control an electric field distribution and conductivity of the layers 224$_1$ and the adjacent semiconductor element regions. With the proper variation of the illumination 212$_1$ and 212$_2$ and the biasing $V_1, V_2, V_3, \ldots V_n$, a more homogeneous electric field distribution both in-plane and across the semiconductor element 118 can be achieved, resulting in better charge collection, which in turn improves the signal-to-noise ratio, energy resolution and detector response homogeneity, which may compensate for lack of material quality and inhomogeneity, space charge effect, and charge trapping.

In addition, the patterned sub-band-gap illumination $212_1$ and $212_2$ can provide effective evacuation of holes, generated by ionizing radiation, from the deep layers of the semiconductor element 118, located far from the cathode 114 and steering electrode (where one is used). This considerably improve the response time of the detector due to reduced polarization and charge trapping, without considerably increasing the semiconductor conductivity in cathode-to-anode direction, the thermal noise and the dark current.

Furthermore, the thickness of the layers $224_1$, having much smaller (up to two orders of magnitude) resistance, is relatively small and can be kept below 5-10% of the overall element thickness. As such, the overall pad-to-cathode resistance is not considerably decreased and the signal-to-noise ratio is not decreased.

The above may be implemented via one or more processors executing one or more computer readable instructions encoded or embodied on computer readable storage medium such as physical memory which causes the one or more processors to carry out the various acts and/or other functions and/or acts. Additionally or alternatively, the one or more processors can execute instructions carried by transitory medium such as a signal or carrier wave.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

What is claimed is:

1. A detector array, comprising:
   a detector configured to detect ionizing radiation and output a signal indicative of the detected radiation, wherein the detector at least includes a semiconductor element; and
   an illumination subsystem configured to generate and transfer sub-band-gap illuminating radiation to selectively illuminate only a sub-portion of the semiconductor element in order to produce a spatially patterned illumination distribution inside the element.

2. The detector array of claim 1, further comprising:
   an electric contact connected to the illuminated sub-portion of the semiconductor element; and
   an electrical source configured to apply an electric potential to the electric contact.

3. The detector array of claim 2, wherein the electric contact is physically adjacent to an outside of the semiconductor element or are located inside the semiconductor element.

4. The detector array of claim 2, wherein the electric contact connected to the illuminated sub-portion is used for at least one of applying a bias to the illuminated sup-portion, collecting and registering charge carriers generated by the ionizing radiation detected by the semiconductor element, or reading out the signal indicative of the detected radiation.

5. The detector array of claim 1, wherein the illumination increases a conductivity of the sub-portion from a first conductivity to a second higher conductivity, wherein the second higher conductivity is higher than a conductivity of non-illuminated sub-portions of the semiconductor element, and wherein the first conductivity is not more than the conductivity of non-illuminated sub-portions of the semiconductor element without the illuminating radiation.

6. The detector array of claim 1, the illumination subsystem comprising:
   at least one illumination source that generates sub-band-gap radiation.

7. The detector array of claim 6, wherein at least one illumination source is coupled to the semiconductor element directly or through a light transmitting media.

8. The detector array of claim 4, wherein the at least one illumination source is an infrared illumination source and the sub-band-gap radiation is infrared radiation.

9. The detector array of claim 1, wherein illumination photon energy does not exceed one half of the semiconductor element band gap.

10. The detector array of claim 1, wherein the semiconductor element includes at least one of cadmium telluride, cadmium zinc telluride, or a single crystal of cadmium telluride or cadmium zinc telluride.

11. The detector array of claim 1, further comprising:
    light transmitting media disposed between the at least one illumination source and the semiconductor element and arranged to pattern and filter the illuminating radiation, producing the spatially patterned, sub-band-gap illuminating radiation.

12. The detector array of claim 1, further comprising at least one reflector, wherein the semiconductor element is disposed between the illumination subsystem and the at least one reflector, and the at least one reflector reflects the illuminating radiation that traverses through the semiconductor element back into the semiconductor element.

13. The detector array of claim 12, wherein the at least one reflector is physically coupled to an outside of the semiconductor element and an electrical source applies the electric potential to the at least one reflector.

14. The detector array of claim 1, wherein the illuminating radiation illuminates sub-portions of at least one individual or separated layers of the semiconductor element.

15. The detector array of claim 1, wherein the ionizing radiation is X-ray, gamma or other ionizing radiation.

16. A method, comprising:
    illuminating only a sub-portion of a semiconductor element of a detector, which is configured to detect ionizing radiation, with spatially patterned sub-gap-band illuminating radiation; and
    detecting ionizing radiation with the detector concurrently with the illuminating of only the sub-portion of the semiconductor element.

17. The method of claim 16, further comprising:
    applying an electric potential to the illuminated sub-portion of the semiconductor element and detecting the ionizing radiation with the detector concurrently with both the illuminating of only the sub-portion of the semiconductor element and the applying the electrical potential to the sub-portion.

18. The method of claim 17, further comprising:
    collecting and registering charge carriers generated by the ionizing radiation.

19. The method of claim 17, wherein the electric potential applied to the spatially patterned illuminated sub-portions of the semiconductor element improves homogeneity of the electric field distribution in the semiconductor element.

20. The method of claim 19, further comprising:
    controlling at least one of an illumination parameter or the applied potential so as to spatially and temporally control the electric field and electric conductivity distribution inside the semiconductor element.

21. The method of claim 16, wherein the applied electric potential and the patterned illumination provides effective holes evacuation through the illuminated sub-portion of the semiconductor element.

22. The method of claim 16, wherein the spatially patterned, sub-gap-band illuminating radiation reduces polarization in the semiconductor element.

* * * * *